(12) United States Patent
Kurfiss et al.

(10) Patent No.: US 8,994,318 B2
(45) Date of Patent: Mar. 31, 2015

(54) ELECTRICAL ON-BOARD NETWORK AND METHOD FOR OPERATING AN ELECTRICAL ON-BOARD NETWORK

(75) Inventors: Jochen Kurfiss, Lomersheim (DE); Sven Finke, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 285 days.

(21) Appl. No.: 13/575,491

(22) PCT Filed: Jan. 20, 2011

(86) PCT No.: PCT/EP2011/050714
§ 371 (c)(1),
(2), (4) Date: Nov. 14, 2012

(87) PCT Pub. No.: WO2011/092099
PCT Pub. Date: Aug. 4, 2011

(65) Prior Publication Data
US 2013/0049650 A1  Feb. 28, 2013

(30) Foreign Application Priority Data
Jan. 27, 2010 (DE) .......................... 10 2010 001 250

(51) Int. Cl.
*H02P 27/04* (2006.01)
*B60L 11/14* (2006.01)
(Continued)

(52) U.S. Cl.
CPC . *B60L 11/14* (2013.01); *B60L 7/14* (2013.01); *B60L 11/005* (2013.01); *B60L 11/1855* (2013.01); *B60L 15/007* (2013.01); *B60R 16/03* (2013.01); *B60L 2210/40* (2013.01); *Y02T 10/7005* (2013.01); *Y02T 10/7022* (2013.01); *Y02T 10/705* (2013.01); *Y02T 10/7077* (2013.01); *Y02T 10/7241* (2013.01); *B60Y 2400/112* (2013.01); *B60Y 2400/114* (2013.01)
USPC . 318/801; 318/722; 318/400.26; 318/400.27; 363/40; 363/56.06; 363/95; 363/120

(58) Field of Classification Search
USPC ............ 318/105, 139, 771, 801, 440, 400.26, 318/400.27, 400.28, 432, 799, 722; 310/180; 180/65.22; 363/40, 56.06, 95, 363/98, 120
See application file for complete search history.

(56) References Cited

U.S. PATENT DOCUMENTS

| 6,919,648 B2 * | 7/2005 | Bolz et al. .................... 290/40 C |
| 7,259,530 B2 * | 8/2007 | Ochiai et al. .................. 318/105 |

(Continued)

FOREIGN PATENT DOCUMENTS

| EP | 1 508 955 | 2/2005 |
| EP | 1 646 522 | 4/2006 |

(Continued)

OTHER PUBLICATIONS

International Search Report, PCT International Application No. PCT/EP2011/050714, dated Apr. 29, 2011.

*Primary Examiner* — Antony M Paul
(74) *Attorney, Agent, or Firm* — Kenyon & Kenyon LLP (57) ABSTRACT

An electrical on-board network of a vehicle, having at least two power circuits and an electrical machine allocated to a drive of the vehicle. The electrical machine has at least two phase systems, connected to a respective inverter, and that at least one of the phase systems is capable of being electrically connected to at least one of the power circuits via the associated inverter. A method for operating an electrical on-board network of a vehicle is also described.

12 Claims, 8 Drawing Sheets

(51) Int. Cl.
*B60L 7/14* (2006.01)
*B60L 11/00* (2006.01)
*B60L 11/18* (2006.01)
*B60L 15/00* (2006.01)
*B60R 16/03* (2006.01)

(56) References Cited

U.S. PATENT DOCUMENTS

| | | | |
|---|---|---|---|
| 7,265,455 B2 * | 9/2007 | Oyobe et al. | 290/1 R |
| 7,859,201 B2 * | 12/2010 | Oyobe et al. | 318/105 |
| 7,891,451 B2 * | 2/2011 | Oyobe et al. | 180/65.275 |
| 8,040,093 B2 * | 10/2011 | Atarashi | 318/400.27 |
| 2009/0033251 A1 * | 2/2009 | Perisic et al. | 318/105 |
| 2009/0033274 A1 * | 2/2009 | Perisic et al. | 318/771 |

FOREIGN PATENT DOCUMENTS

| | | |
|---|---|---|
| EP | 2 020 334 | 2/2009 |
| EP | 2 168 830 | 3/2010 |

\* cited by examiner

ELECTRICAL ON-BOARD NETWORK AND METHOD FOR OPERATING AN ELECTRICAL ON-BOARD NETWORK

FIELD OF THE INVENTION

The present invention relates to an electrical on-board network of a vehicle, having at least two power circuits and having an electrical machine allocated to the drive of the vehicle. The present invention also relates to a method for operating an electrical on-board network of a vehicle.

BACKGROUND INFORMATION

Electrical on-board networks of the general type mentioned above are available. For example, European Patent No. EP 1 646 522 B1 describes a motor vehicle on-board network having a multi-voltage generator motor that includes an electrical machine, a regulator, and a pulse inverter. These are provided for the supply of electrical power to a first sub-network having at least one first consumer and to a second sub-network having at least one second consumer. In the first sub-network, a first nominal voltage should be present, and in the second sub-network a second nominal voltage should be present, and a DC/DC converter should be situated downstream from the multi-voltage generator motor. Both the first and the second sub-network are connected to the multi-voltage generator motor via the pulse inverter. Using the described motor vehicle on-board network, it is possible to supply the first sub-network with a variable voltage.

If the electrical machine is fashioned as a starter-generator, in particular a belt-driven starter-generator, it can be used both in order to recuperate brake energy in a recuperation operating mode and to realize a stop-start function. In the latter case, for example a drive aggregate of the drive of the vehicle, in particular an internal combustion engine, is switched off during periods of time in which it is not required. If the power of the internal combustion engine is to be made available again, the electrical machine is used to start the internal combustion engine. If the vehicle is a microhybrid vehicle, the energy required for the starting is provided for example by a conventional lead accumulator. This has the disadvantage that it has only a limited maximum charge current or discharge current, which in addition is still a function of its state of charge. Thus, the possibility of saving energy through recuperation of braking energy, and thus reducing the $CO_2$ emission of the drive, is significantly limited.

For this reason, as described in European Patent No. EP 1 646 522 B1, the electrical machine is used together with a capacitor and a DC/DC converter. Here, with the aid of the DC/DC converter the energy recuperated during the braking process is stored in the capacitor and/or is provided to one of the power circuits. When the capacitor is discharged, the DC/DC converter can in addition be used to charge the capacitor with energy from the accumulator. In this way, the vehicle can easily be fashioned as a microhybrid, micro-mild hybrid, or mild hybrid. The disadvantage of such an electrical on-board network is however its comparatively high cost outlay.

SUMMARY

In contrast, an example electrical on-board system in accordance with the present invention can be realized comparatively inexpensively, and at the same time can achieve a high degree of hybridization. According to the present invention, this is achieved in that the electrical machine is provided with at least two phase systems, each connected to a respective inverter, and in that at least one of the phase systems is capable of being electrically connected, via the associated inverter, to at least one of the power circuits. Each of the phase systems of the electrical machine has at least one external conductor. The external conductors of each phase system are connected to the inverter associated with the phase system, and via this are connectable, or are connected, to the at least one power circuit. Here, a permanent connection of at least one of the phase systems to at least one of the power circuits may be present. However, it can also be provided that the at least one phase system can be connected only to at least one of the power circuits, i.e. also to all of them. In this way, the power circuits of the on-board network can be separated from one another. Moreover, the power circuits can be connected to one another in such a way that when the start-stop function is realized with the electrical machine an increased starting torque is available for the drive aggregate. In addition, a torque support of the drive aggregate, for example of the internal combustion engine, can be provided using the electrical machine. This means that the inverter can be used both to rectify the alternating current produced by the electrical machine for the power circuits and also to rectify the current coming from the power circuits for the electrical machine. For this purpose, for example a control device can be provided by which at least one of the inverters is correspondingly controlled.

A development of the present invention provides that the power circuits each have an energy storage device, one of the energy storage devices being in particular an accumulator and another of the energy storage devices being in particular a capacitor, in particular a double-layer capacitor. At least one of the energy storage devices can be charged using the power produced by the electrical machine, or can be used to operate the electrical machine. Here, each energy storage device is allocated to one of the power circuits. However, it can also be provided that at least one of the power circuits has a plurality of energy storage devices. For example, for the charging of the respective energy storage device all power circuits are supplied with power produced by the electrical machine, but not all of the power circuits or energy storage devices are used for the operation of the electrical machine. Advantageously, the accumulator and the capacitor are provided as energy storage devices, and the latter may be a double-layer capacitor (EDLC). Here, the accumulator has a larger capacity compared to the capacitor. In contrast, in comparison with the accumulator the capacitor can be charged and also discharged with a larger current strength. Advantageously, the capacitor is thus used to operate the electrical machine and to absorb the electric energy produced by this machine during recuperation operation. The accumulator, which is for example a lead accumulator, is in contrast charged or discharged with lower current strengths. It is used primarily to supply power to electrical devices of the vehicle.

A development of the present invention provides that the inverters can be operated independently of one another. In this way, each power circuit can be supplied with a voltage allocated to it. This voltage is determined by the current strength in an exciter winding of the electrical machine. By adapting this current strength, the output voltages of the electrical machine, present in the phase systems, can indeed be adapted, but here the ratio of the voltages is fixedly predetermined by the ratios of the numbers of windings of the electrical machine, respectively assigned to the phase systems. However, by operating the inverters independently of one another a flexible energy distribution to the power circuits can be carried out, for example through a pulse-width modulation of the respective inverter. However, a disadvantage of this is that a higher loss of the electrical machine may occur.

A development of the present invention provides that at least one of the phase systems is constantly connected to at least one of the power circuits via the associated inverter. Thus, it is not provided to separate the phase system from the power circuit. This means that an electric connection between the inverter allocated to the phase system and the power circuit is constantly present. However, by corresponding operation of the respective inverter, as described above, the voltage in the power circuit can for example be adjusted.

A development of the present invention provides that a switching device, in particular having FET switches, is provided in which at least one of the phase systems is connectible to at least one of the power circuits. For this purpose, the switching device is connected to the at least one inverter and to the at least one power circuit, so that via the switching device a corresponding connection can be created or interrupted. Advantageously, a plurality of the phase systems, or inverters allocated to them, and/or a plurality of the power circuits, are connected to the switching device, so that using the switching device it can be freely selected which of the phase systems is to be connected to which of the power circuits. Here, the switching device is for example designed so as to connect all phase systems to one of the power circuits, or one of the phase systems to all the power circuits, or all the phase systems to all the power circuits. In this way, a flexible connection of the phase systems, or of the inverters, to the power circuits can be carried out. This enables for example an optimal exploitation of the energy obtained during braking for the later starting of the drive aggregate, or of the internal combustion engine, through an increased voltage in one of the power circuits. In addition, depending on the charge state of at least one of the energy storage devices, the starting energy can be taken either from one of the energy storage devices, or from another of the energy storage devices, or from a plurality of energy storage devices.

A development of the present invention provides that the energy storage devices of at least two power circuits can be connected in parallel or in series. The connecting of the energy storage devices is advantageously also realized via the switching device. By connecting the energy storage devices either in parallel or in series, the power circuits can be adjusted to particular requirements of the electrical on-board network, or of the drive of the vehicle. For example, in order to start the drive aggregate or to realize a torque support using the electrical machine, it can make sense to connect the energy storage devices in series in order to provide a higher voltage for operating the electrical machine.

In addition, the present invention relates to a method for operating an electrical on-board network of a vehicle, in particular according to the above description, the on-board network having at least two power circuits and having an electrical machine allocated to a drive of the vehicle. Here it is provided that the electrical machine has at least two phase systems each of which is connected to a respective inverter, and that at least one of the phase systems is electrically connectible via the associated inverter to at least one of the power circuits. The electrical on-board network of the vehicle can be developed in a manner corresponding to the above statements.

A development of the present invention provides that using a switching device, in particular having FET switches, at least one of the phase systems can be connected to at least one of the power circuits. As explained above, using the switching device it is possible to carry out a flexible connection of the at least one phase system to the at least one power circuit. This can be provided as a function of an operating state of the electrical on-board network of the vehicle. The switching device has for example FET switches, each external conductor of each phase system being allocated at least one such switch.

A development of the present invention provides that, in a normal operating mode of the on-board network, an energy storage device fashioned as an accumulator is connected to at least one of the phase systems. The accumulator is part of one of the power circuits of the on-board network. In the manner described, the accumulator can be charged with power produced by the electrical machine, and/or the energy stored in the accumulator can be used to operate the electrical machine. In the normal operating mode, it is in particular provided that the accumulator is charged only with the aid of the electrical machine, and is otherwise used to supply power to electrical devices of the vehicle.

A development of the present invention provides that in the normal operating mode, in a recuperation operating mode, and/or in a start operating mode of the drive, the accumulator and/or a further energy storage device fashioned as a capacitor are connected to at least one of the phase systems. Thus, only in the recuperation operating mode or start operating mode is it provided that the capacitor is effectively connected to the phase system or to the electrical machine. The electrical on-board network can for example be operated either in normal operating mode, in recuperation operating mode, or in start operating mode. In normal operating mode, only the accumulator is connected to the at least one phase system, and in the other operating modes only the capacitor or the accumulator and the capacitor are connected to the at least one inverter. In this way, the high charge current or discharge current provided by the capacitor can be used to operate the electrical machine and the accumulator can be used to operate the electrical device of the vehicle.

Below, the present invention is explained in more detail on the basis of exemplary embodiments shown in the figures, without thereby limiting the present invention.

DETAILED DESCRIPTION OF EXAMPLE EMBODIMENTS

Figure 1:
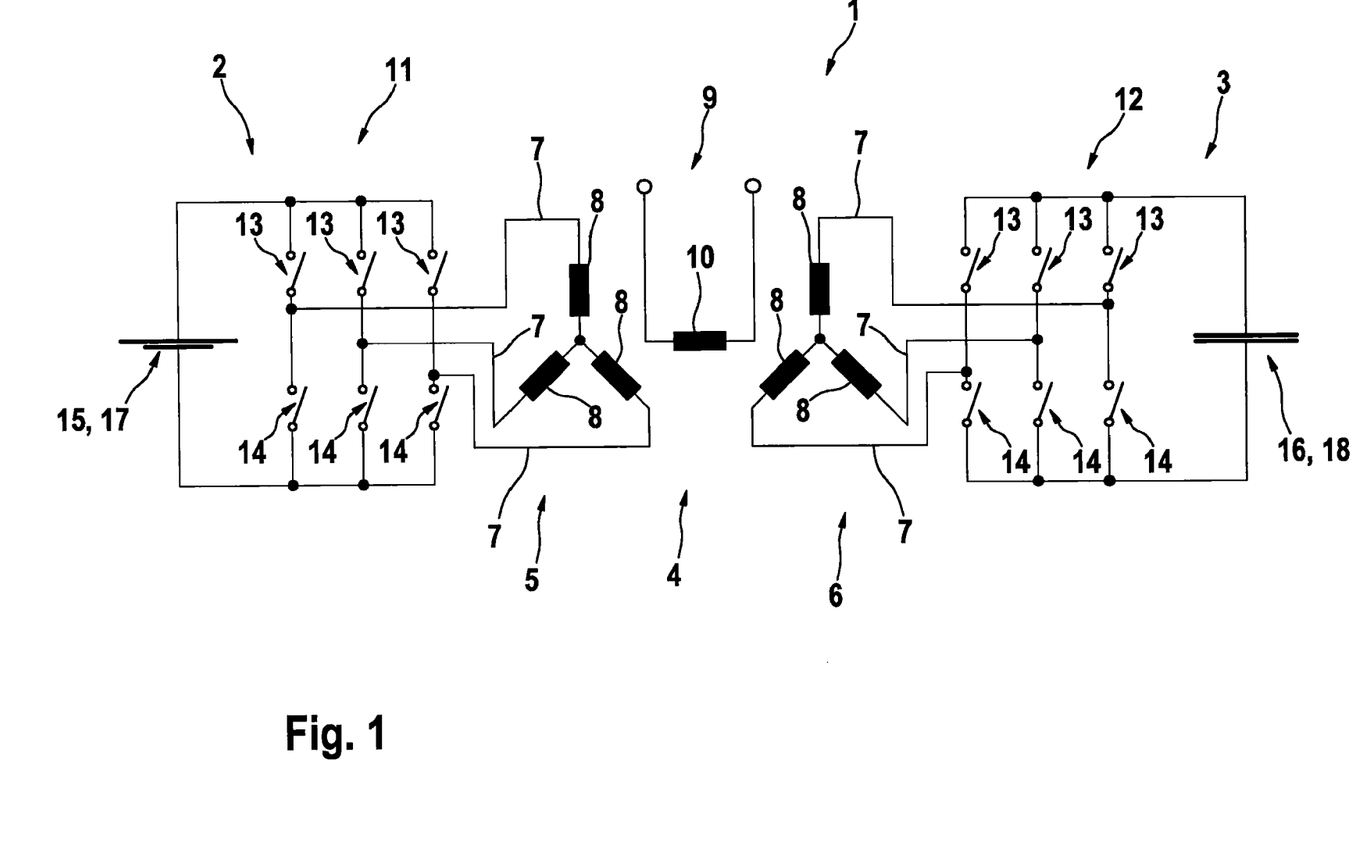
FIG. 1 shows a schematic representation of an electrical on-board network having two power circuits and an electrical machine, in a first specific embodiment.

FIG. 1 shows a part of an electrical on-board network 1 of a vehicle (not shown in more detail). On-board network 1 has two power circuits 2 and 3 and an electrical machine 4 allocated to a drive of the vehicle. Power circuit 2 is for example a 12V power circuit and power circuit 3 is a 48V power circuit. In the specific embodiment of on-board network 1 shown here, electrical machine 4 is realized in a six-phase configuration, two phase systems 5 and 6 being provided each having three external conductors 7 of electrical machine 4. Each external conductor 7 is connected to a coil 8 or winding, allocated thereto, of electrical machine 4. The six phases of electrical machine 4 are thus divided into two groups each having three phases. Electrical machine 4 also has an exciter circuit 9 that is allocated to phase systems 5 and 6 and that has a coil 10. An excitation of electrical machine 4 is adjustable using exciter circuit 9.

Each of phase systems 5 and 6 is connected to a respective inverter 11 or 12. This inverter preferably has, at the side of electrical machine 4, a number of terminals corresponding to the number of external conductors 7 in the respective phase system 5 or 6. To each external conductor 7 there is allocated a respective high-side switch 13 and low-side switch 14, each having a freewheeling path connected in parallel, formed for example by a freewheeling diode. On the side of inverters 11 and 12 facing away from electrical machine 4, power circuits 2 and 3 are each connected to said inverters. This means that power circuit 2 is connected to phase system 5 via inverter 11, and power circuit 3 is connected to phase system 6 via inverter 12. A respective energy storage device 15 or 16 is provided in each of power circuits 2 and 3, energy storage device 15 of power circuit 2 being fashioned as accumulator 17, and energy storage device 16 of power circuit 3 being fashioned as capacitor 18, in particular as a double-layer capacitor (EDLC).

In the specific embodiment of on-board network 1 shown in FIG. 1, power circuit 2 is permanently connected to phase system 5 and power circuit 3 is permanently connected to phase system 6. However, an adjustment of the voltages present in power circuits 2 and 3, or even a complete decoupling of the respective power circuit 2 or 3 from the respective phase system 5 or 6, is possible through corresponding controlling of inverters 11 and 12. For this purpose, inverters 11 and 12 can be operated independently of one another, being correspondingly controlled for example by a control device not shown here. In this way, a complete separation of power circuits 2 and 3 is achieved. Electrical machine 4 can be used to produce electrical energy by which energy storage devices 15 and 16 can be charged; alternatively, however, the energy stored in energy storage devices 15 and/or 16 can be used to operate the electrical machine. Through corresponding actuation of high-side switch 13 and low-side switch 14 of inverters 11 and 12, the direct current of power circuits 2 and 3 can be converted to the alternating current required by electrical machine 4.

Figure 2:
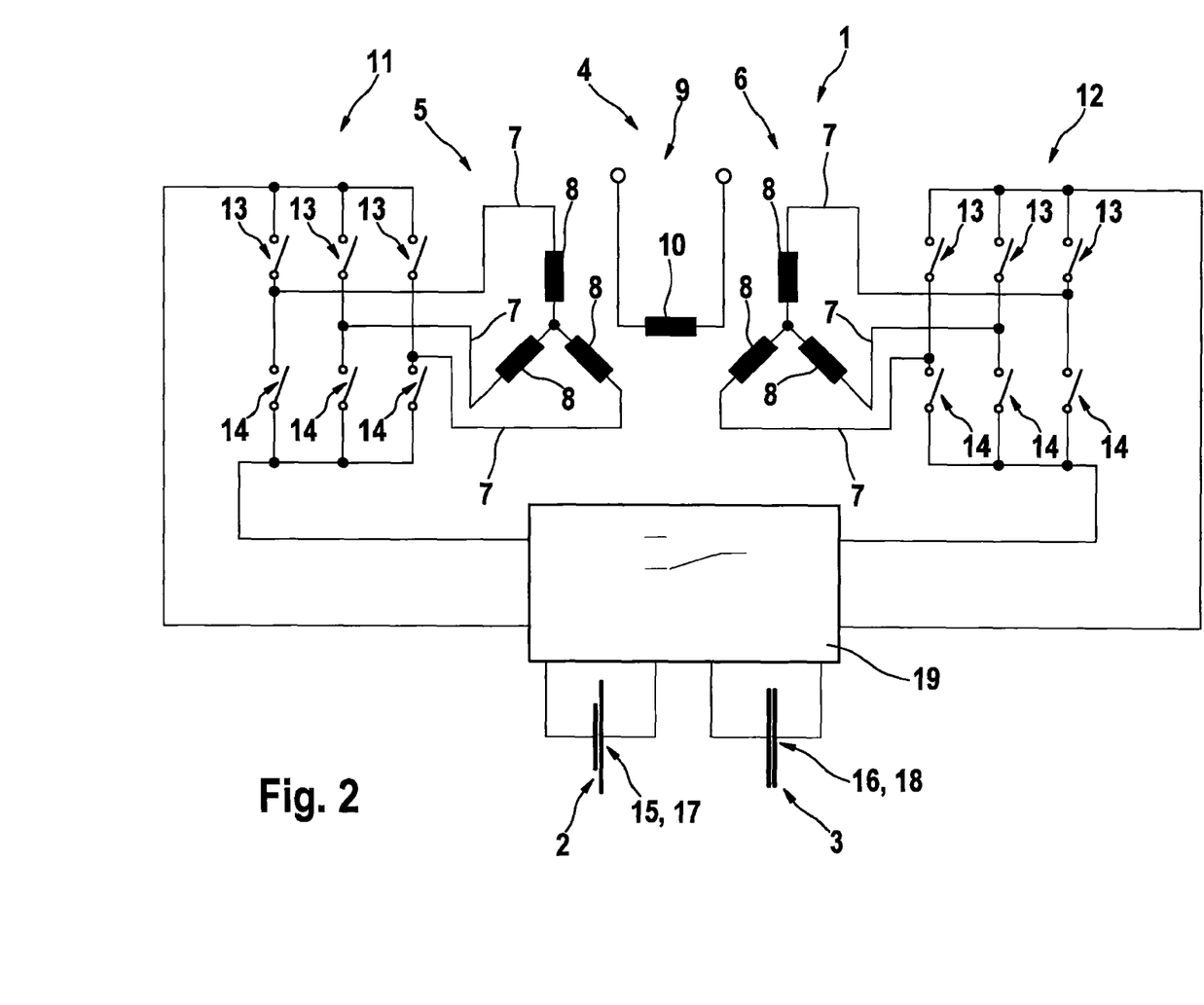
FIG. 2 shows the electrical on-board network in a second specific embodiment having a switching device that is connected between inverters and the power circuits.

FIG. 2 shows a second specific embodiment of on-board network 1 according to the present invention. The specific embodiment shown in FIG. 2 differs from that shown in FIG. 1 in that a switching device 19 is provided that is connected to both inverters 11 and 12 and to both power circuits 2 and 3. Switching device 19 includes an in principle arbitrary number of switching elements (not shown) by which at least one of phase systems 5 or 6 can be connected to at least one of power circuits 2 or 3. This means that, in principle, an arbitrary wiring or connection is possible between phase systems 5 and 6 of electrical machine 4 and power circuits 2 and 3. Switching device 19 is for example an FET switching matrix connected to the already-mentioned control device.

Here, the switching elements of switching device 19 are FET switches that are used for the flexible connection of phase systems 5 and 6 to power circuits 2 and 3. In this way, the energy produced by electrical machine 4 can be partitioned among energy storage devices 15 and 16 in an arbitrary manner. This makes possible for example an optimal exploitation of the energy obtained during braking for the later starting of a drive aggregate of the drive of the vehicle, for example an internal combustion engine, for which electrical machine 4 acts as a starter. Here, for example a higher voltage is provided in power circuit 3, which includes accumulator 17, than in power circuit 2 having accumulator 17. In addition, depending on the charge state of energy storage devices 15 and 16, the energy required for the operation of electrical machine 4 can be taken either from energy storage device 15, from energy storage device 16, or from both energy storage devices 15 and 16. Likewise, in the case of generator operation of electrical machine 4, the produced electrical energy can be partitioned among power circuits 2 and 3 in an in principle arbitrary fashion.

Figure 3:
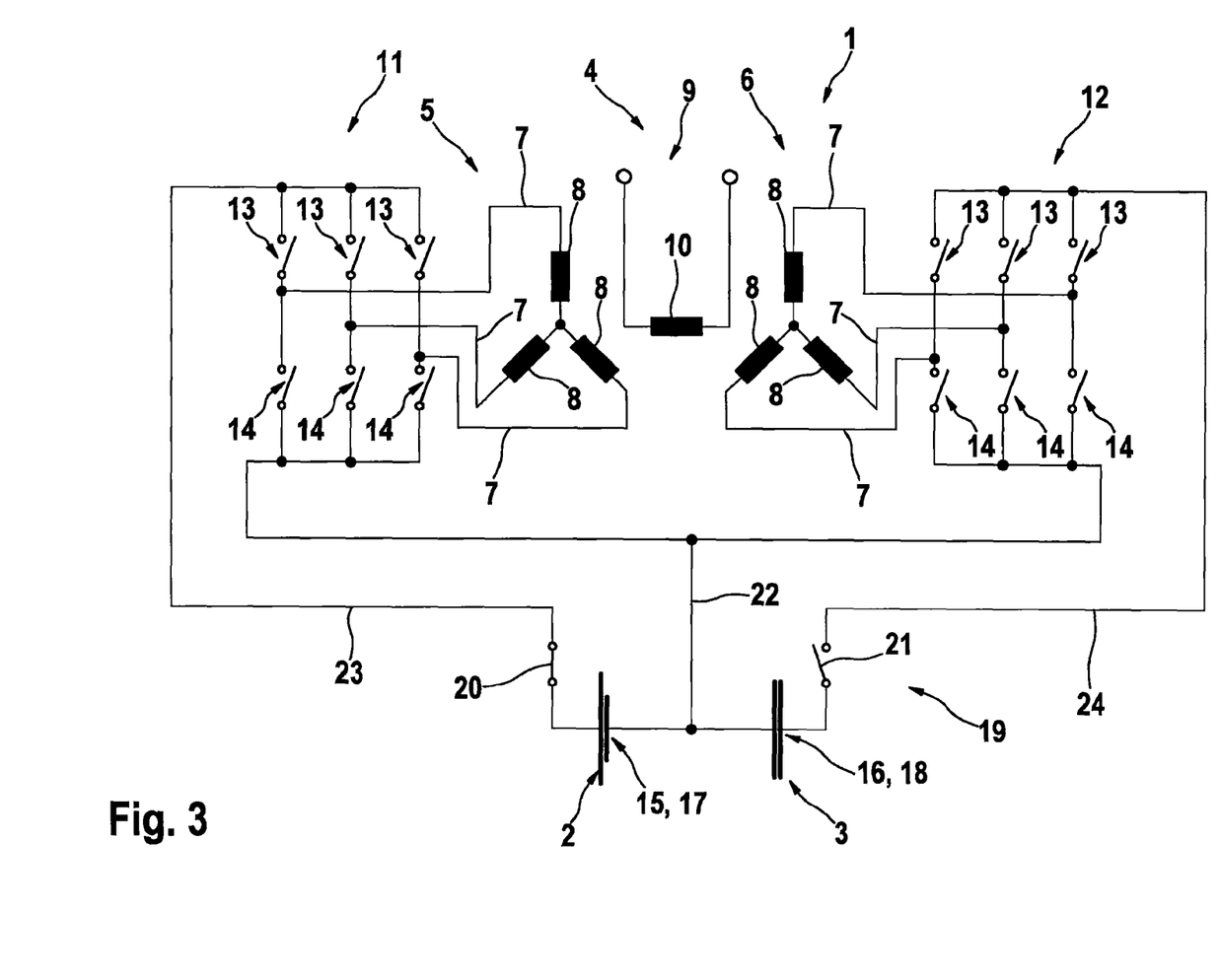
FIG. 3 shows the on-board network known from FIG. 2 in a third specific embodiment, the switching device producing a first switching configuration.
Figure 4:
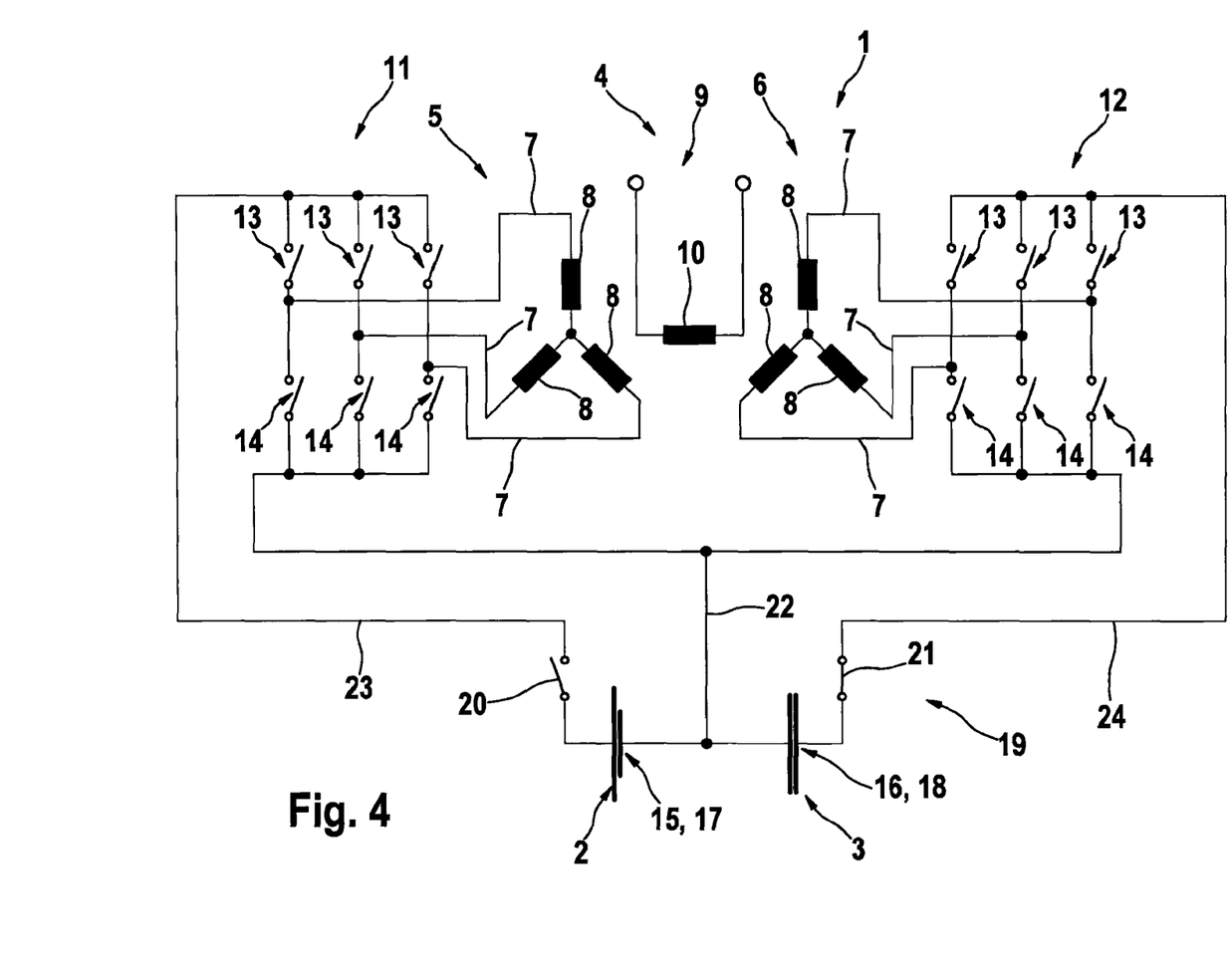
FIG. 4 shows the electrical on-board network known from FIG. 3, the switching device producing a second switching configuration.
Figure 5:
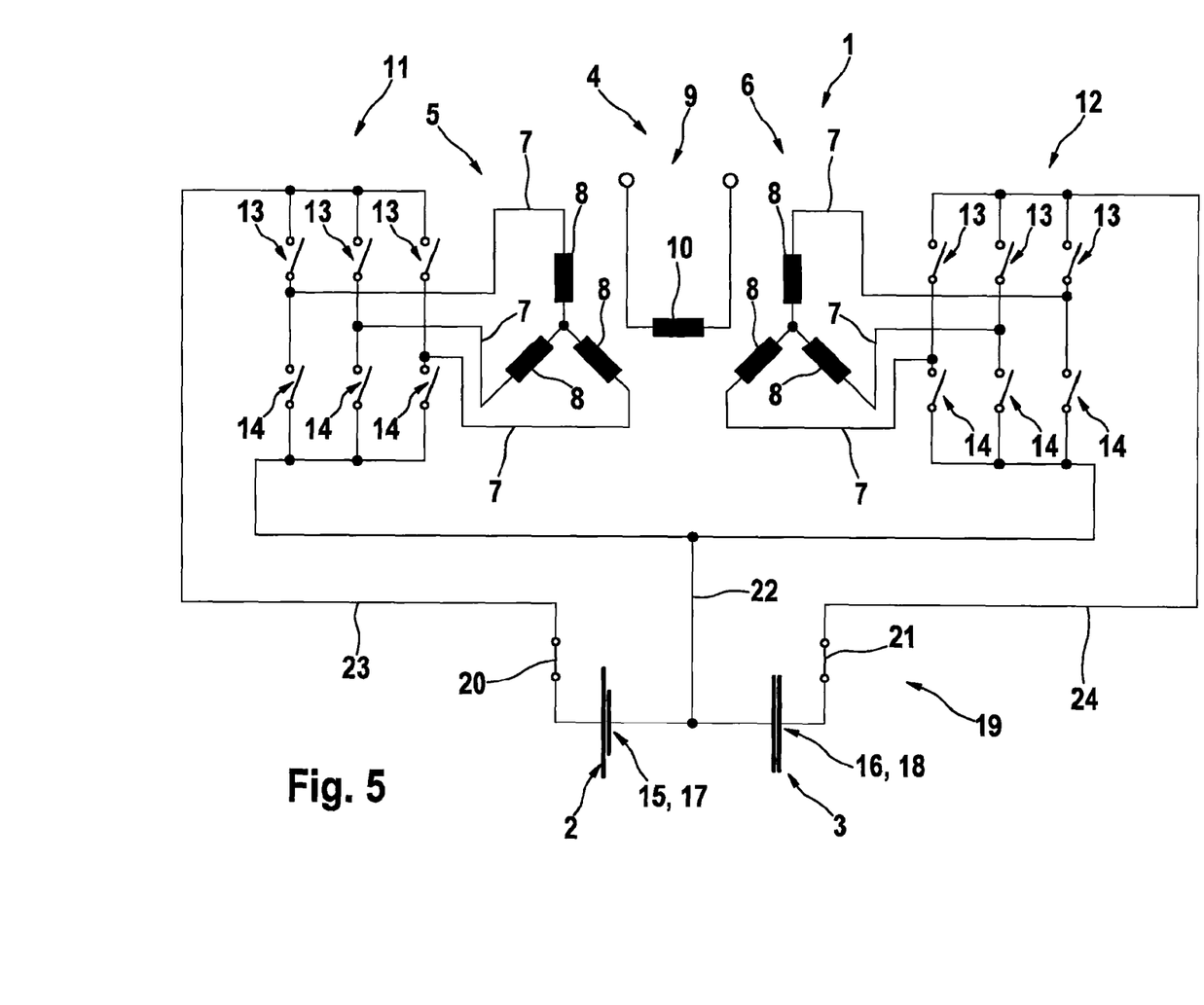
FIG. 5 shows the on-board network known from FIG. 3, the switching device setting a third switching configuration.

FIGS. 3, 4, and 5 show a third specific embodiment of on-board network 1 having a comparatively simple realization of switching device 19. This device has only two switching elements 20 and 21. Here, energy storage devices 15 and 16 are connected via a common line 22 to the two inverters 11 and 12, in this case to the low-side switches 14 thereof. In contrast, switching element 20 is connected via a line 23 only to inverter 11, or high-side switches 13 thereof, and switching element 21 is connected via a line 24 to inverter 12 or high-side switches 13 thereof. Accordingly, using switching elements 20 and 21 a connection between phase system 5 and energy storage device 15, or between phase system 6 and energy storage device 16, can be created or interrupted. In FIG. 3, switching device 19 is present in a first switching configuration, switching element 20 being closed and switching element 21 being open, so that a connection is present between phase system 5 and energy storage device 15, while phase system 6 is not connected to energy storage device 16 or to power circuit 3.

In such a specific embodiment, as shown in FIGS. 3, 4, 5, when there is recuperation of braking energy using electrical machine 4, the voltage in power circuit 2 is maintained, and nonetheless energy at a higher voltage is stored in energy storage device 16 for a subsequent operation or for starting electrical machine 4. In addition, it enables a defined stopping of the drive aggregate using electrical machine 4, so that for this purpose throttle valves of the drive aggregate, which in this case is fashioned as an internal combustion engine, need no longer be closed. In this way, the start behavior of the internal combustion engine can be significantly improved and the energy required for its starting can be minimized. In addition, the architecture shown in FIGS. 3 through 5 of on-board network 1 enables a variable drawing of the starting energy from energy storage devices 15 and 16 as a function of the charge state thereof, in particular of energy storage device 16. The switching configuration shown in FIG. 3 of switching device 19 is present during driving operation, or normal operation, of the vehicle.

In contrast, FIG. 4 shows a switching configuration of the switching device that is set during a recuperation operating mode in order to recuperate braking energy using electrical machine 4. In this configuration, switching element 20 is open and switching element 21 is closed, so that an electrical connection of power circuit 2 to phase system 5 is interrupted, and an electrical connection of power circuit 3 to phase system 6 is created. The current produced by electrical machine 4 during the braking energy recuperation is thus stored in energy storage device 16.

FIG. 5 shows a switching configuration of switching device 19 in which both switching elements 20 and 21 are closed in order to create the electrical connection between power circuits 2 and 3 and phase systems 5 and 6. In this way, a larger quantity of energy can be made available in a start operating mode of the drive of electrical machine 4.

Figure 6:
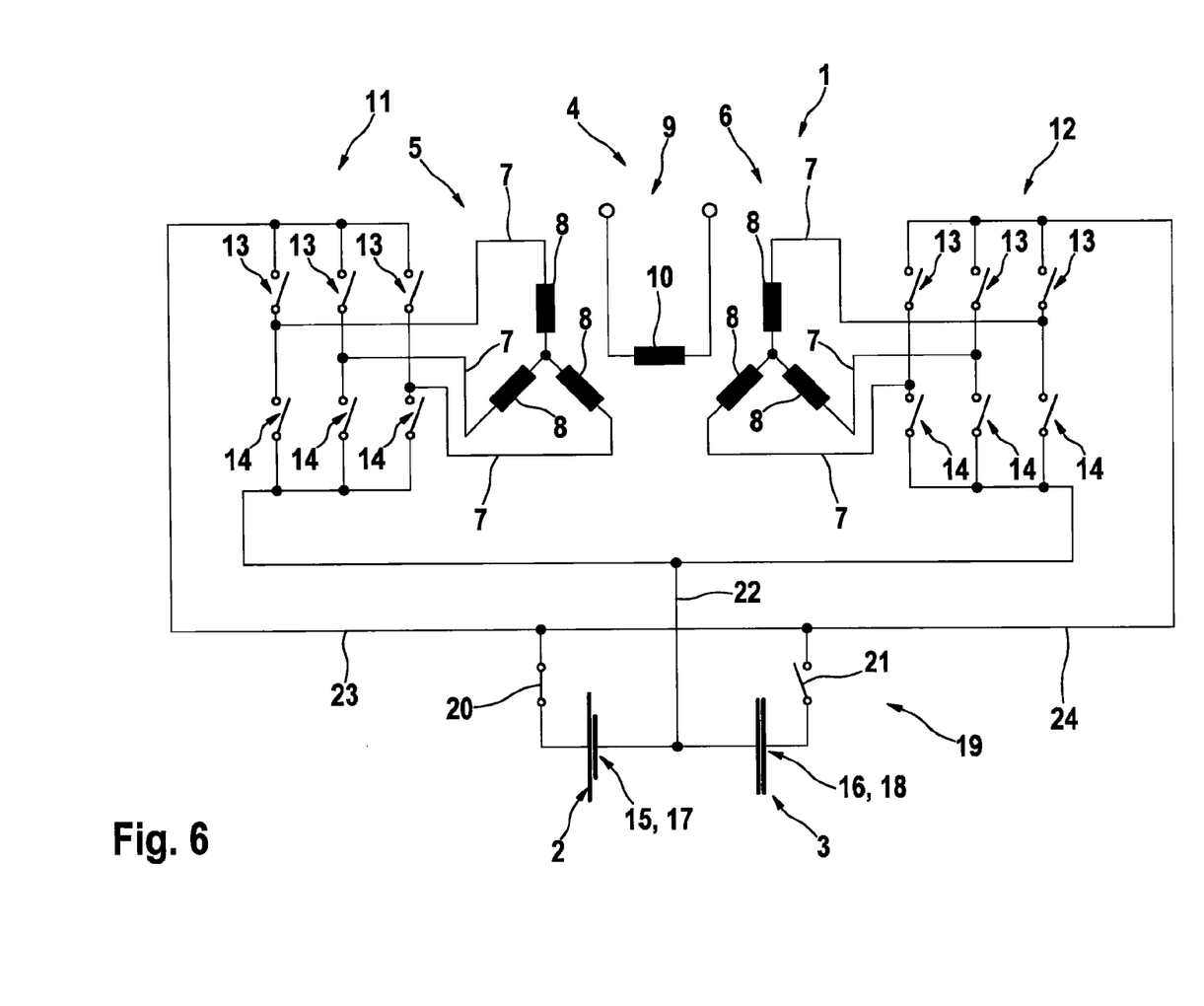
FIG. 6 shows the electrical on-board network in a fourth specific embodiment, the first switching configuration being set using the switching device.
Figure 7:
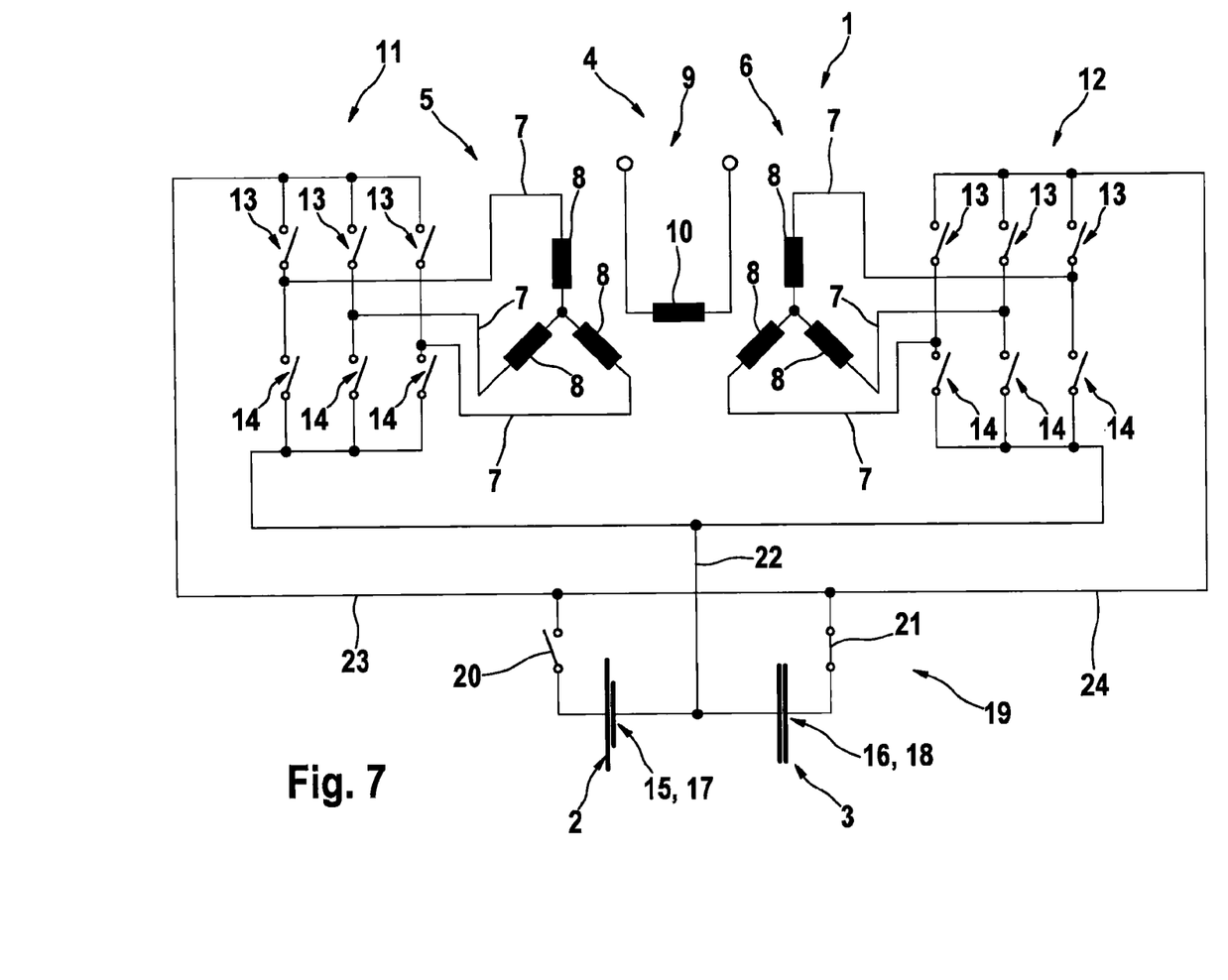
FIG. 7 shows the on-board network known from FIG. 6, the second switching configuration being set.

FIGS. 6 and 7 show a fourth specific embodiment of on-board network 1. In this embodiment, phase systems 5 and 6 are connected to one another and power circuits 2 and 3 can be connected to this common connection via switching device 19. In such a circuit, the losses of the electrical machine in driving or normal operation, and disturbances in power circuit 2, which includes accumulator 17 and is for example a 12 V power circuit, can be reduced during recuperation operating mode and/or start operating mode. In this embodiment of switching device 19, the two phase systems 5 and 6 can optionally be connected to at least one of power circuits 2 and 3. FIG. 6 shows a switching configuration of switching device 19 for driving or normal operation. Here, switching element 20 is closed and switching element 21 is open.

FIG. 7 shows the exemplary embodiment, known from FIG. 6, of switching device 19 in the second switching configuration, present during recuperation operating mode and during a start operating mode of the drive or of electrical machine 4. Here, switching element 20 is open and switching element 21 is closed.

For the exemplary embodiments of switching device 19 presented on the basis of FIGS. 6 and 7, both switching elements 20 and 21 can be closed in order to increase the available current strength and in this way to enable an emergency start function for the drive aggregate using electrical machine 4.

Figure 8:
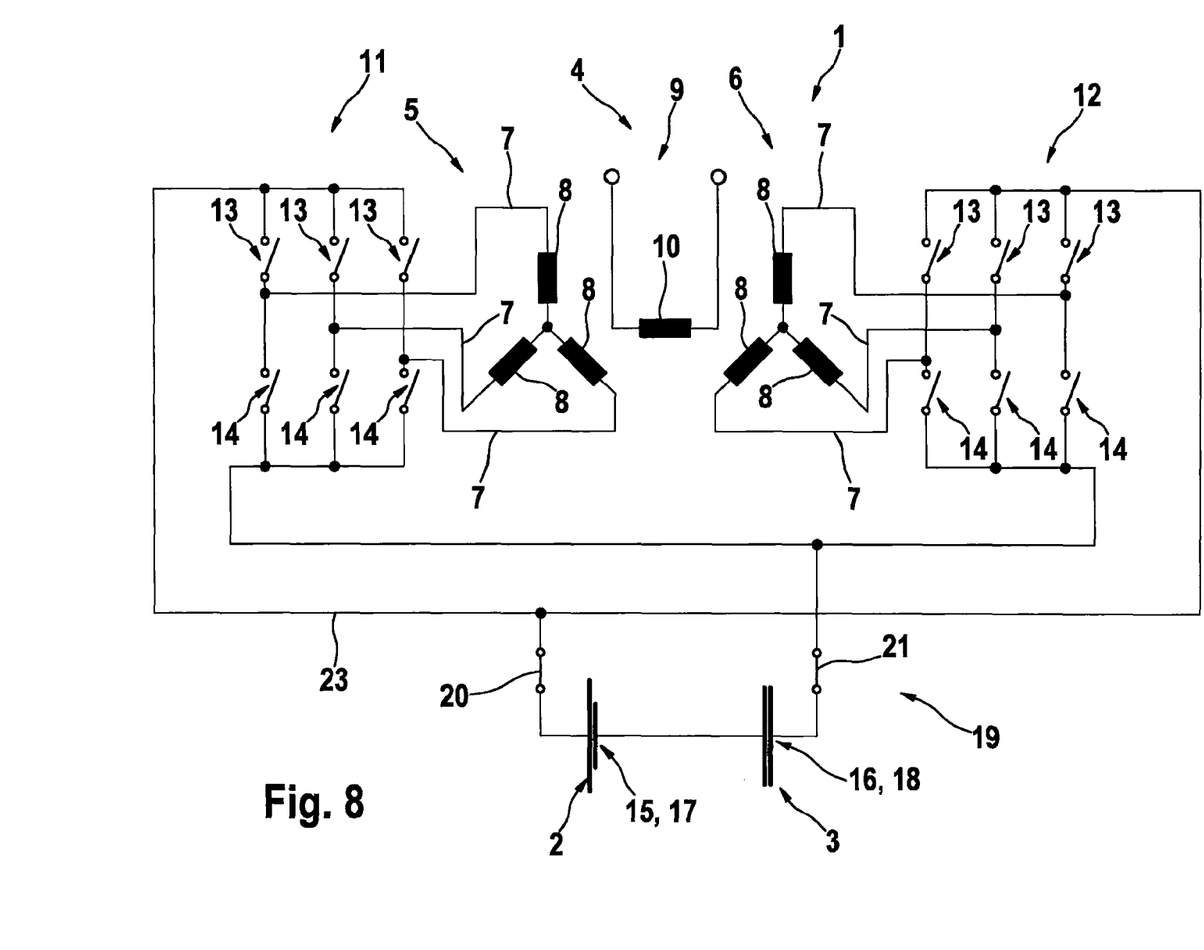
FIG. 8 shows the electrical on-board network in a fifth specific embodiment.

FIG. 8 shows a further exemplary embodiment of switching device 19 in a switching configuration used in driving operating mode in order to realize a torque support of the drive aggregate by electrical machine 4. With such a circuit, the voltage present in power circuit 2 can be prevented from decreasing strongly due to the drawing of energy from energy storage device 15 in order to operate electrical machine 4 as the rotational speed of electrical machine 4 increases. For this purpose, energy storage devices 15 and 16 are connected in series.

In principle, switching device 19, as shown in FIG. 2, can be fashioned such that using it the switching configurations or switching states shown in FIGS. 3 through 8 can be realized. Electrical machine 4 is preferably a belt-driven starter-generator of the drive that is capable of being effectively connected to the drive aggregate.

What is claimed is:

1. An electrical on-board network of a vehicle, comprising:
    at least two power circuits;
    an electrical machine allocated to a drive of the vehicle, the electrical machine including at least two phase systems that are each connected to a respective inverter; and
    a switching device that is external to the inverters and is configured to selectively electrically connect, via respective independent connections, each of the power circuits to each of the inverters, and thereby to, the respective phase systems.

2. The electrical on-board network as recited in claim 1, wherein the power circuits each have an energy storage device, one of the energy storage devices being an accumulator, and another of the energy storage devices being a double-layer capacitor.

3. The electrical on-board network as recited in claim 1, wherein the inverters are operable independently of one another.

4. The electrical on-board network as recited in claim 1, wherein at least one of the phase systems is constantly connected to at least one of the power circuits via the respective inverter.

5. The electrical on-board network as recited in claim 1, wherein the switching device includes FET switches.

6. The electrical on-board network as recited in claim 1, wherein the energy storage devices of at least two power circuits can be connected in parallel or in series.

7. The electrical on-board network as recited in claim 1, further comprising:
    a control device to control at least one of the respective inverters.

8. The electrical on-board network as recited in claim 1, wherein the power circuits each includes a plurality of energy storage devices.

9. A method for operating an electrical on-board network of a vehicle, the on-board network including (a) at least two power circuits, (b) an electrical machine allocated to a drive of the vehicle, the electrical machine including at least two phase systems that are each connected to a respective inverter, and (c) a switching device that is external to the inverters, the method comprising:
    selectively electrically connecting, by the switching device and via respective independent connections, each of the power circuits to each of inverters, and thereby to, the respective phase systems.

10. The method as recited in claim 9, wherein the switching device includes FET switches.

11. The method as recited in claim 9, further comprising:
    connecting an energy storage device fashioned as an accumulator to at least one of the phase systems in a normal operating mode of the on-board network.

12. The method as recited in claim 9, wherein in at least one of a normal operating mode, a recuperation operating mode, and a start operating mode of the drive, at least one of the accumulator and a further energy storage device fashioned as a capacitor are connected to at least one of the phase systems.

* * * * *